(12) United States Patent
Dubrall (10) Patent No.: US 10,310,149 B1
(45) Date of Patent: Jun. 4, 2019

(54) OPTICAL VIEWING DEVICE AND METHOD

(71) Applicant: Danny L. Dubrall, Mesa, AZ (US)

(72) Inventor: Danny L. Dubrall, Mesa, AZ (US)

(*) Notice: Subject to any disclaimer, the term of this patent is extended or adjusted under 35 U.S.C. 154(b) by 76 days.

(21) Appl. No.: 15/689,778

(22) Filed: Aug. 29, 2017

(51) Int. Cl.
  *G02B 5/04* (2006.01)
  *G02B 5/20* (2006.01)
  *G02B 7/18* (2006.01)
  *G02B 7/00* (2006.01)
  *G02B 27/02* (2006.01)

(52) U.S. Cl.
  CPC ............... *G02B 5/20* (2013.01); *G02B 7/006* (2013.01); *G02B 7/1805* (2013.01); *G02B 27/022* (2013.01)

(58) Field of Classification Search
  CPC ........ G02B 5/20; G02B 7/006; G02B 7/1805; G02B 27/022; G02B 21/0012; G02B 21/22; G02B 21/368; A61B 90/37
  USPC ........................................................ 359/831
  See application file for complete search history.

(56) References Cited

U.S. PATENT DOCUMENTS

| 2013/0222897 | A1* | 8/2013 | Yamazaki | .......... | G02B 21/0012 |
| | | | | | 359/376 |
| 2015/0124094 | A1* | 5/2015 | Loong | .................... | H04N 7/181 |
| | | | | | 348/148 |

* cited by examiner

*Primary Examiner* — Euncha P Cherry
(74) *Attorney, Agent, or Firm* — Cahill Law Group LLC (57) ABSTRACT

An optical viewing device is constructed having a housing with a passage extending therethrough to permit an observer to view a subject through the passageway. A pair of optical prisms are mounted within the housing and passageway, each prism designated to accommodate one of the observer's eyes. The prisms are mounted for rotation upon an axis substantially perpendicular to the observer's line of sight through the passageway. Limited inter-prism rotation is permitted to accommodate variations in the observer's left and right eyes. A filter supporting means is provided to support selected colored optical filters to be placed adjacent the opening of the housing to permit the observer to view a subject through the passageway, prisms, and optical filters.

5 Claims, 8 Drawing Sheets

FIG. 7B
SECTION D-D

SECTION Y-Y
FIG. 8B

OPTICAL VIEWING DEVICE AND METHOD

FIELD OF THE INVENTION

The present invention pertains to optical viewing devices and methods to observe a selected object, subject, or scene.

BACKGROUND OF THE INVENTION

It is known that some objects, particularly animals, humans and living organisms radiate electromagnetic waves. These electromagnetic waves may be in narrow bandwidths such that individuals, with proper equipment, can observe these radiations in the visual spectrum. The radiations, sometimes referred to as a radiant glow, halo, radiant field or aura, have been observed in the past by utilizing equipment incorporating prisms or coated films that are placed between the observers eye and the source of the radiation. In some circumstances, the perceived glow may be the result of reflected radiation rather than radiation generated by the observed object. It is believed that these observed radiant fields frequently provide an indication of some physical status or condition—stress bands in metal for example. Prior art devices for viewing these objects have utilized equipment incorporating prisms that are placed between the observer's eye and the object being viewed. The prisms are formed of transparent material that exhibit selected blue, red and yellow bandwidths as well as a clear prism. Each prism, with a chosen color, is placed in the sight path between the object and the observer and rotated; the procedure is followed by the remaining colored prisms and a clear prism. The prior art viewing devices have traditionally mounted these colored and clear prisms so that they can be successively presented to the observer while rotated; however, the manner of mounting the prior art prisms resulted in both translation as well as rotation of the prism and required a cumbersome mechanical arrangement to permit the successive presentation of the respective prisms.

It is believed that the observation of such scenes by an observer includes viewing the scene through the respective colored prisms followed by viewing the scene through a clear prism. The selected prismatic wavelengths are believed in some cases to excite the human brain and sensitize it to the reception and observation of an optical phenomena; upon viewing the object through the respective colored prisms, with the appropriate excitation of the chosen wavelengths received by the human brain, followed by viewing the object through a clear prism is believed to permit the observer to observe the image through the clear prism and which then provides an optical presentation to the observer.

SUMMARY OF THE INVENTION

The present invention is directed to an optical viewing device and method wherein the expensive colored prisms are eliminated by the substitution of a single clear prism that is mounted for rotational movement about an axis perpendicular to the observer's line of sight; the selected electromagnetic wavelengths having the appropriate wavelength spectrums are provided by interchangeable optical filters each incorporating the selected blue, red and yellow wavelength spectrums and clear prism that passes all wavelengths. Separation of color component from prisms to colored slides reduces the quantity of expensive prisms; further, rotation of the clear prism about an axis, which may be an optical axis, reduces the variation of the focal length. In a preferred embodiment, the present invention incorporates a pair of clear separate prisms each adjustable to a different eye of the observer and independently adjustable by the observer to permit the prisms to be angularly offset from each other to accommodate variations in the respective observer's eyes.

While the individual prisms, one dedicated to each eye, may be independently adjustable, the two prisms may be rotated simultaneously by the observer during the observation session. Thus, while the prisms are being rotated about an axis passing through the prism during an observation session, the calibration or offset of the prisms with respect to each other remains constant during the session.

An optical viewing device incorporating the teachings of the present invention is shown in the accompanying drawings wherein FIGS. 1-4 are perspective views of the device of the present invention showing the device housing having a view adjustment extension for contacting the forehead of the observer to properly adjust the distance from the viewer's eyes to the prism of the device. Rotation knobs are shown for rotating the clear prisms mounted within the housing and a mounting means is provided for receiving optical filters having the chosen wavelength color spectrum. As noted above, the prisms are clear and one is provided for each eye wherein the individual prisms may be slightly rotated with respect to the other to accommodate variations in the observer's eyes. Once the calibration or initial setting is obtained to accommodate the variations in the observer's eyes, the prisms rotate as a single unit.

BRIEF DESCRIPTION OF THE DRAWINGS

The present invention may more readily be described by reference to the accompanying drawings in which.

DETAILED DESCRIPTION OF THE INVENTION

The design embodies a symmetrical design of the housing 10 such that the prism tray assembly may be assembled into a left-handed or right-handed configuration, drawings herein referenced may show either configuration for reference.

Figure 1:
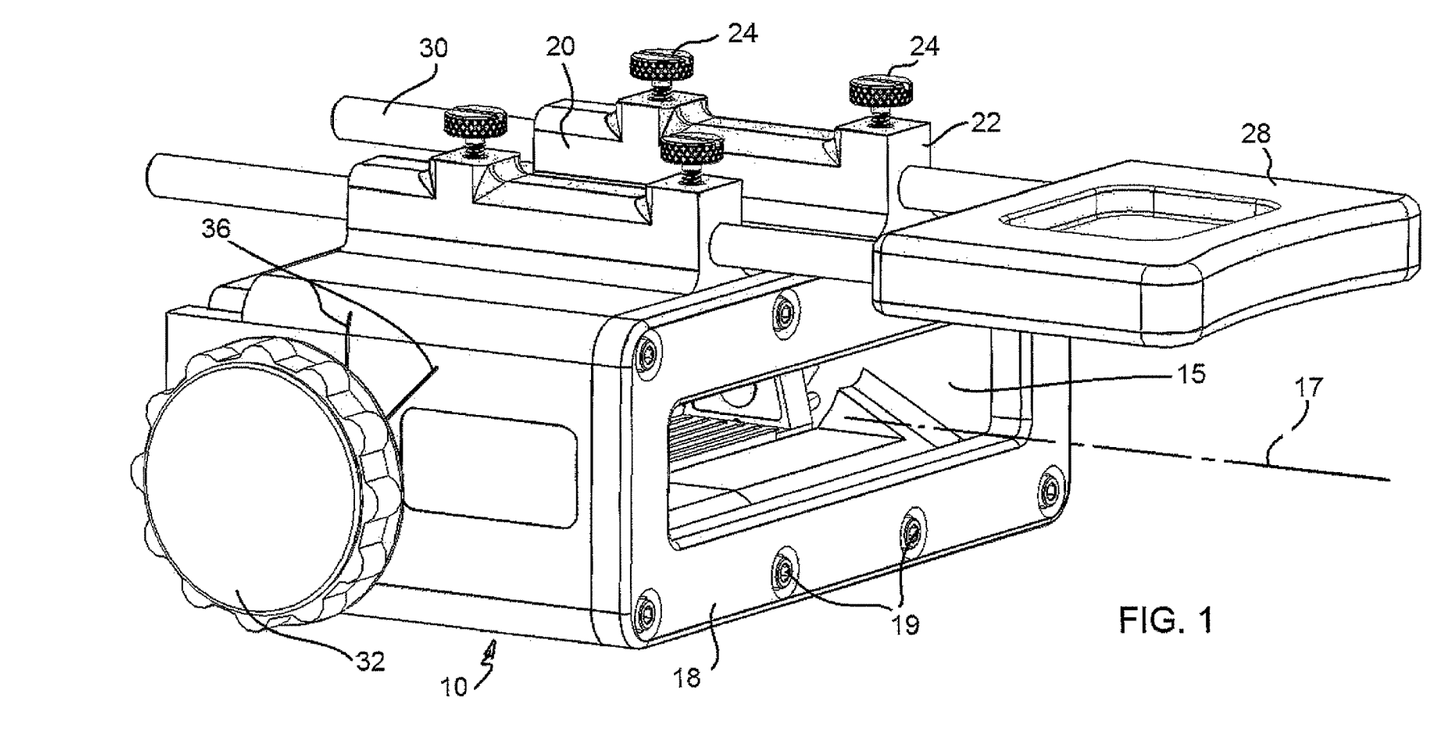
FIG. 1 is a perspective view showing the rear, top, and left side of an optical viewing device constructed in accordance with the teachings of the present invention.

Referring to FIG. 1, an optical viewing device constructed in accordance with the teachings of the present invention is shown. The perspective view of FIG. 1 shows the rear, top and left side of the device; as used herein, the portion of the device facing a using observer is referred to as the rear of the device. Left and right are the left and right of the observer and that portion of the device facing the subject being observed is herein referred to herein as the front of the device. The device incorporates a housing 10 containing prisms (to be described) and supporting filters (to be described) and incorporates a direct and straight optical viewing passageway 15 through which an observer may view an observed subject. The view of the observer is generally along a line of sight indicated in FIG. 1 at 17. The housing 10 is provided with a flange 18 secured to the end of the housing by a plurality of assembly screws 19. The housing 10 may conveniently be formed of two halves to facilitate the mounting and assembly of clear prisms therein. The halves can conveniently be secured in assembled condition by the flange 18 and assembly screws 19. The housing 10 is also provided with a pair of view adjustment rails 20 each incorporating stanchions 22 to accept thumb screws 24. A view adjustment extension 28 is mounted on view adjustment rods 30 which extend through appropriate passageways in the view adjustment rails 20 and are secured in place through thumb screws 24 extending through the stanchions 22 to contact the view adjustment rods 30. The view adjustment extension 28 is shaped to conveniently contact a viewer's forehead to maintain an appropriate distance between the viewer's eyes and the prisms mounted within the housing 10. In practice, it has been found that this distance may effectively be established at approximately six to nine inches.

The housing 10 also supports a pair of operating knobs 32 and 34. The left operating knob 32 is shown in FIG. 1 and is rotatable to rotate the prisms (to be described) mounted within the housing 10. The housing may be provided with convenient indexing marks 36 to assist the viewer in adjusting the angle of rotation of the prisms.

Figure 2:
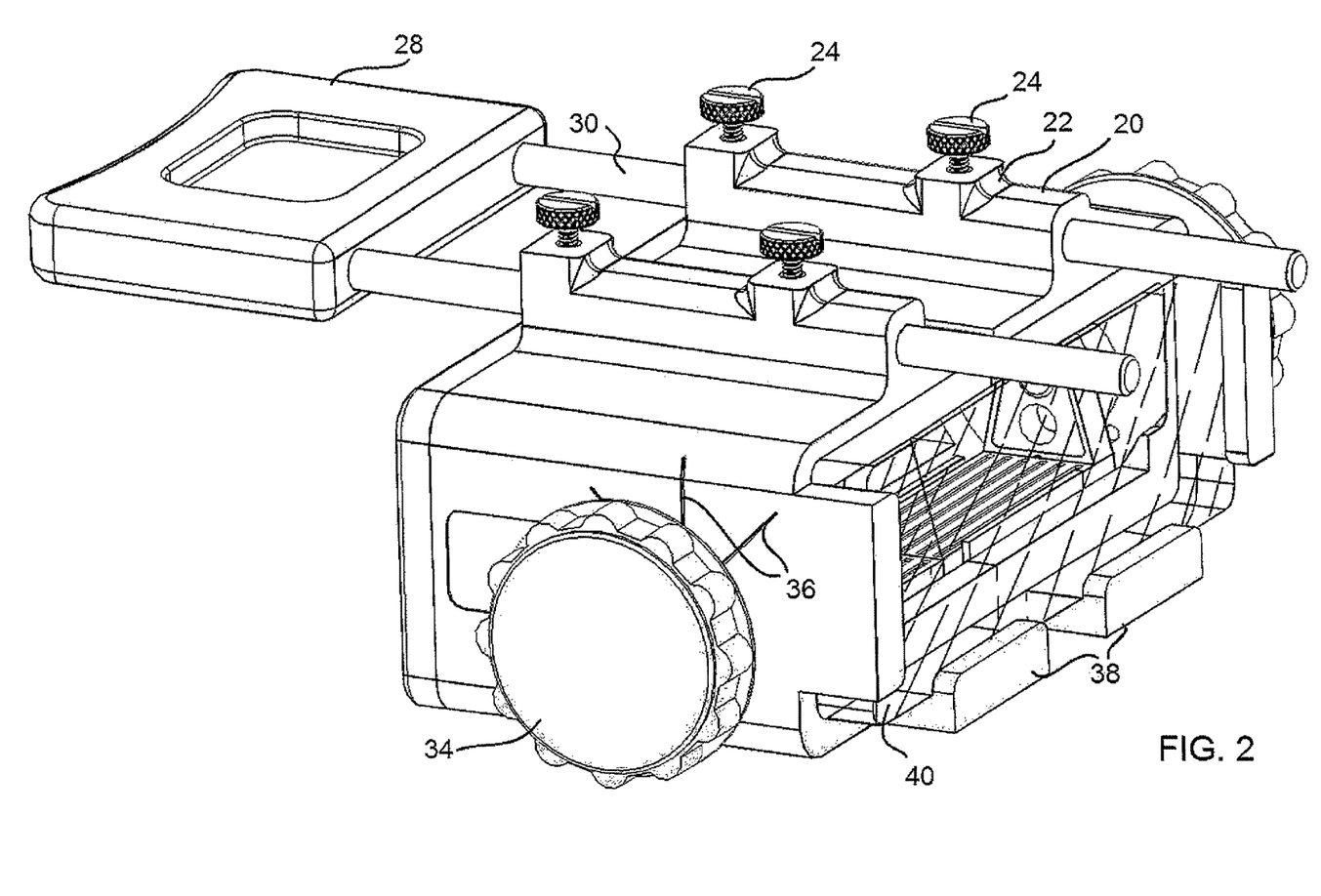
FIG. 2 is a perspective view showing the front, top and right side of a device constructed in accordance with the teachings of the present invention.

Referring to FIG. 2, a perspective view of the device of FIG. 1 is shown with the front, top and right side of the device revealing the corresponding positioning of the view adjustment extension 28, the view adjustment rails 20, stanchions 22 and thumb screws 24. The front of the housing is provided with a means for supporting an optical filter 40 in the viewer's line of sight such as a filter supporting flange 38 to receive, position, and support the filter 40 and thus position the filter 40 along the viewer's line of sight 17 (FIG. 1). The optical filter 40 may be an absorptive filter made from optical glass or may be constructed of rigid plastic materials such as polycarbonate or acrylic. The filters are chosen to transmit different selected ranges of wavelengths in the red, blue and yellow portions of the visible light spectrum. The wavelength ranges can be chosen to generally correspond to the wavelengths of lapis lazuli, blood ruby, and yellow lapis to represent the blue, red and yellow wavelength ranges. With the filter 40 in place and supported by the flange 38 the viewer thus observes the subject through the prisms mounted within the housing (to be described) and through the selected filter. Alternatively, the housing may be provided with a slot to receive the filter 40.

Figure 3:
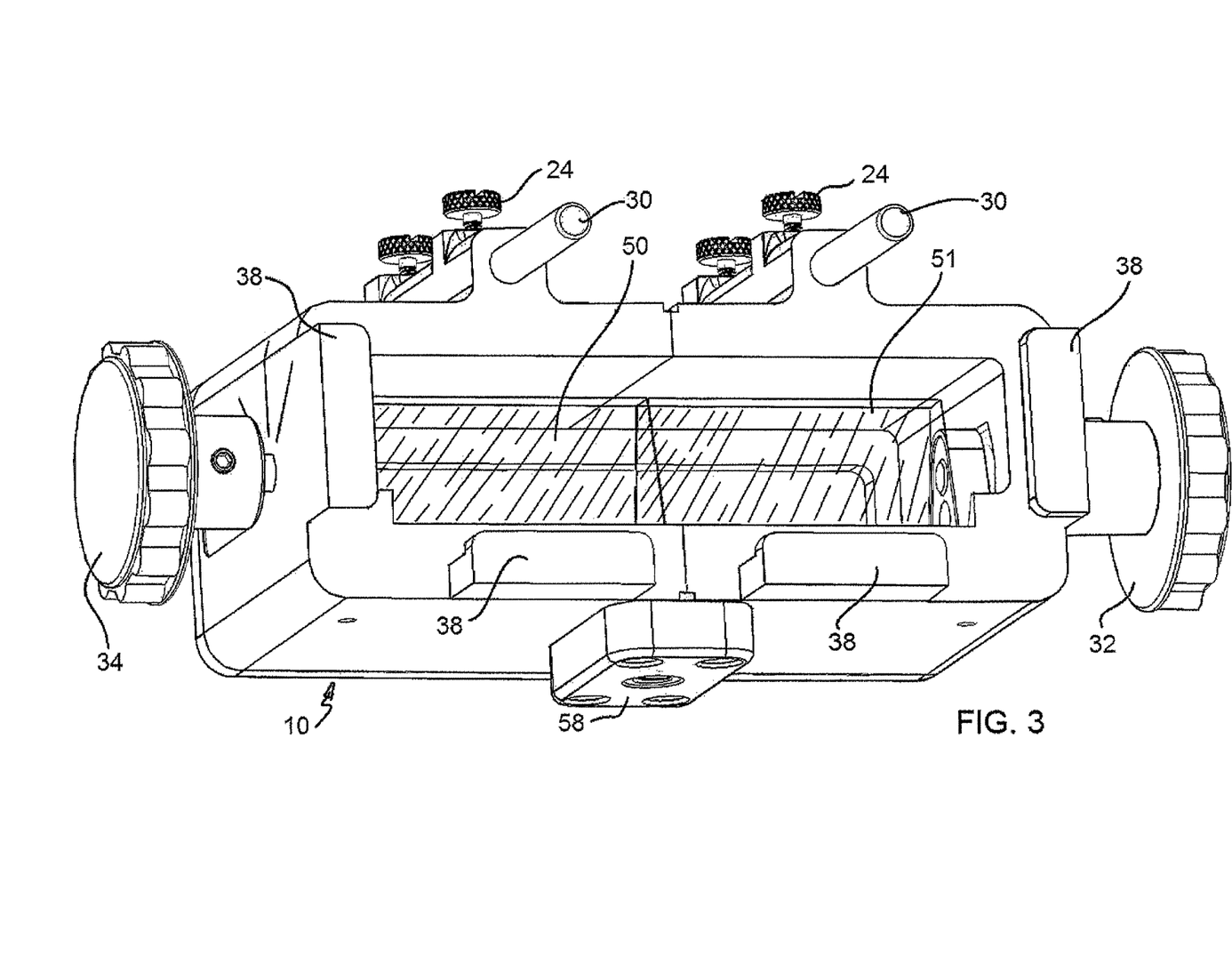
FIG. 3 is a perspective view showing the right side, front and bottom of a device constructed in accordance with the teachings of the present invention.

Referring to FIG. 3, the device of FIG. 1 is shown with the right side, front and bottom of the device illustrated. The left and right operating knobs 32 and 34, respectively, are shown while the filter supporting flange 38 is shown without a filter mounted thereon to permit the internally mounted prisms 50 and 51 to be shown. The left prism 51 is mounted for rotation by operating the left operating knob 32 and the right prism 50 rotated by operating the right operating knob 34. Each prism may thus be rotated independently of the other by rotating the corresponding operating knob while holding the opposite operating knob in a fixed position. In this way, the inter-prism positioning, or relative prism rotated position, may be adjusted. Both prisms may be operated simultaneously by rotating either or both operating knobs without holding one of the knobs in a fixed position.

Figure 8A:
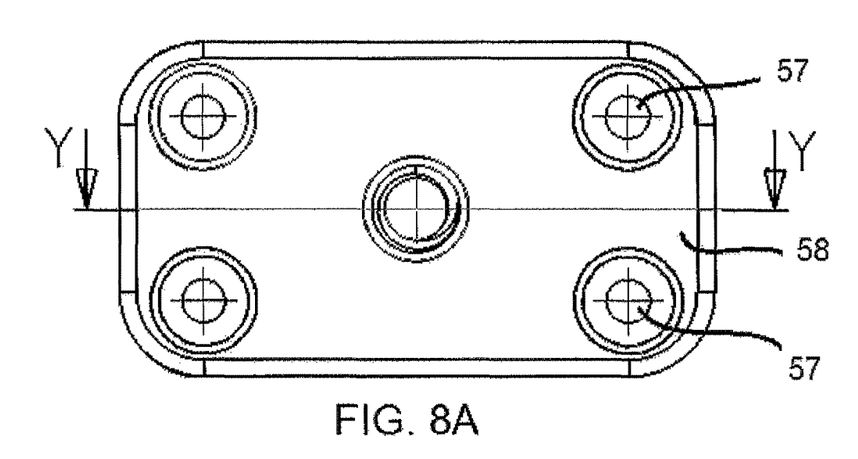
FIG. 8A is a plan view of the attachment fitting secured to the device of the present invention.
Figure 8B:
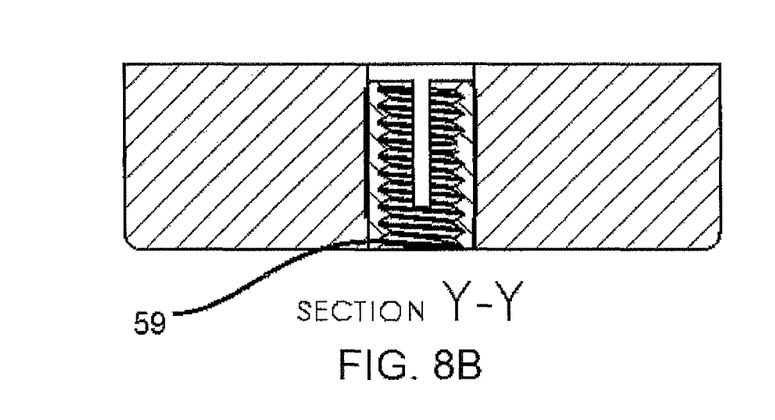
FIG. 8B is a cross-sectional view of FIG. 8A taken along line Y-Y.

An attachment member 58 is provided to permit the housing 10 to be secured to a supporting structure such as a conventional camera tripod. The attachment member 58 is shown and described in greater detail in FIG. 8.

Figure 4:
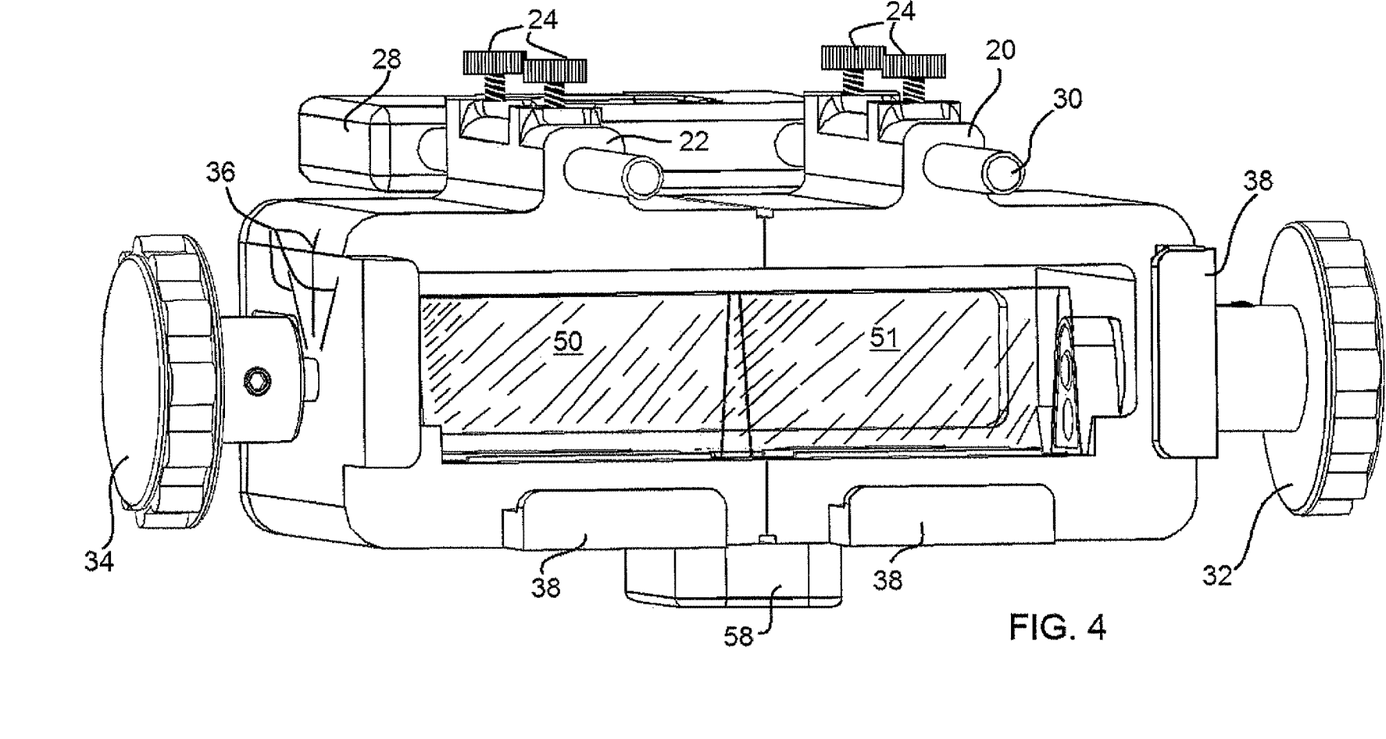
FIG. 4 is a perspective view showing the front and right side of a device constructed in accordance with the teachings of the present invention.

Referring to FIG. 4, the device of FIG. 1 is again shown. The perspective view of FIG. 4 illustrates the front and right side of the device. The device of FIG. 4 is shown without a filter supported by the flange 38. The left and right operating knobs are shown, each having index marks 36 provided on the side of the housing 10. The view adjustment rails 20 and view adjustment rods 30 are shown secured in position by thumb screws 24 extending through corresponding stanchions 22. In FIG. 4 the left prism 51 and the right prism 50 are clearly shown.

Figure 5A:
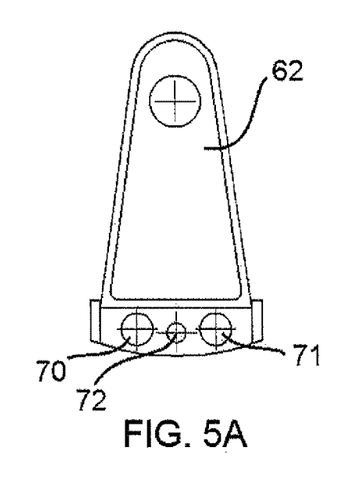
FIG. 5A is a front elevational view of a tray supporting arm of the right prism tray.
Figure 5B:
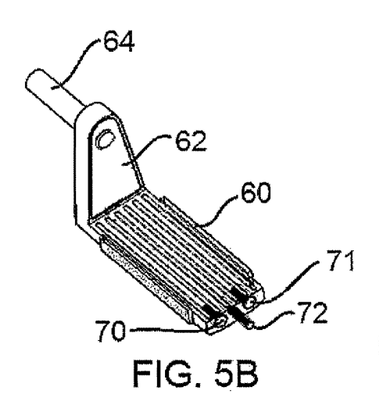
FIG. 5B is a perspective view of the right prism tray.
Figure 5C:
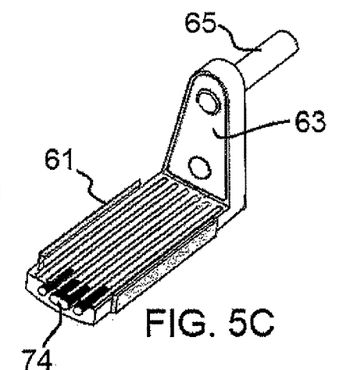
FIG. 5C is a perspective view of the left prism supporting tray.
Figure 5D:
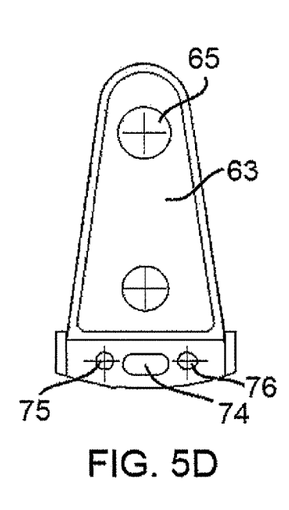
FIG. 5D is a front elevational view of the tray supporting arm of the left prism tray.
Figure 5E:
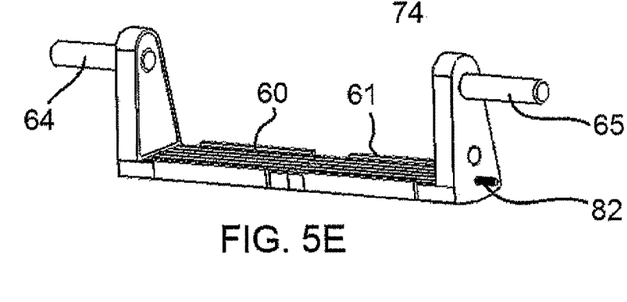
FIG. 5E is a perspective view of the assembled right and left prism trays.

The prisms 50 and 51 are triangular prisms supported within the device housing on trays. Referring to FIGS. 5A-5E, the right prism tray 60 and the left prism tray 61 are shown disassembled to more clearly show the right tray support arm 62 and the left tray support arm 63 together with corresponding right tray pivot pin 64 and left tray pivot pin 65. The prism trays contact and support the respective prisms and are rotatable about the corresponding pivot pins. The right tray support arm 62 receives the corresponding pivot pin 64 and is provided with tray positioning metal inserts 70 and 71 and an inter-tray pivot limiting pin 72. The left tray supporting arm 63 is provided with an inter-tray pivot limiting slot 74 as well as magnetic inserts 75 and 76. When the right prism tray 60 and left prism tray 61 are joined as shown in FIG. 5E, the inter-tray pivot limiting pin 72 extends into the pivot limiting slot 74 to limit the relative angular rotation of each tray with respect to the other. That is, when the left and right prism trays are joined, the magnets and magnetic inserts maintain sufficient frictional force to permit the two trays to be moved simultaneously through the rotation of one or both of the operating knobs. The two trays, however, may be rotated with respect to each other through a limited angular distance by rotating one of the operating knobs (and thus the corresponding pivot pin) while holding the other operating knob. This limited angular inter-tray positioning permits the corresponding prisms to be slightly angularly offset with respect to each other to accommodate variations between the observer's eyes. When the inter-tray, and thus the inter-prism, relative positioning is accomplished, tray positioning magnets and magnetic inserts retain this slight offset positioning so that both prisms may be simultaneously rotated by either or both operating knobs.

Figure 6:
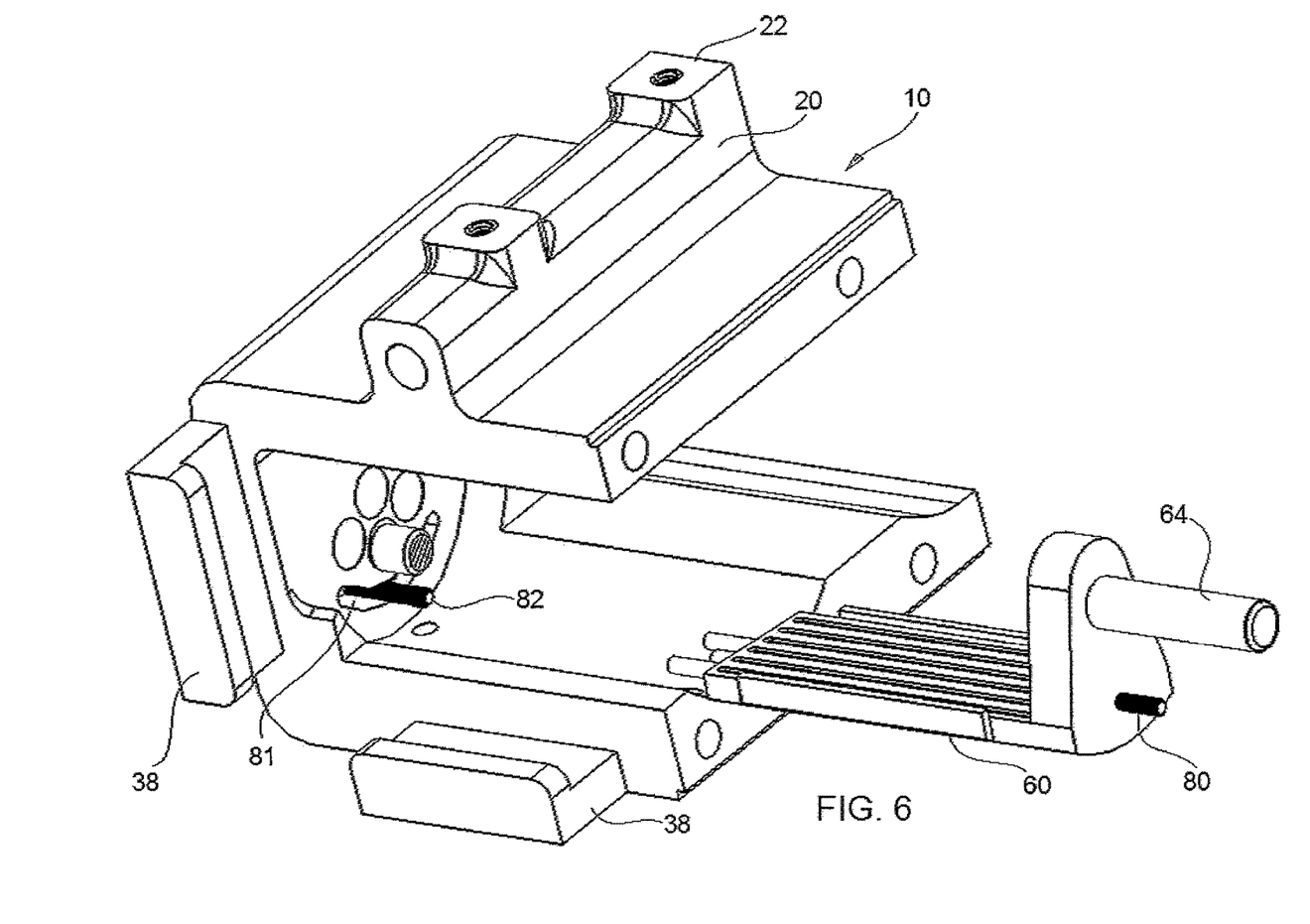
FIG. 6 is a perspective view of an alternate assembly of the front right half of the device, partially exploded, with the right prism tray removed and the left prism tray viewable.

Referring to FIG. 6, a perspective of the front right half of the device of FIG. 1, partially exploded, is shown with the right prism tray removed. The housing 10 as shown in FIG. 1 may conveniently be constructed of two halves for the convenient mounting of prisms and prism trays therein. In FIG. 6, it may be seen that the right half of the housing is provided with integrally formed view adjustment rails 20 and stanchions 22 with a cylindrical channel provided to accept the view adjustment rods 30 shown in FIG. 1. The filter supporting flange 38 is shown and prism tray 60 is shown. When the left and right prism trays are joined together as shown in FIG. 5E, the prism trays may be rotated by rotating either the left operating knob or right operating knob resulting in the rotation of the respective prisms on their respective prism trays about the corresponding pivot pins. Prism rotation limiting pins 80 and 82 extend into corresponding prism rotation limiting slots in housing 10 with right side 81 and left side not shown to thereby limit the total angular rotation of the prisms when in use.

Figure 7A:
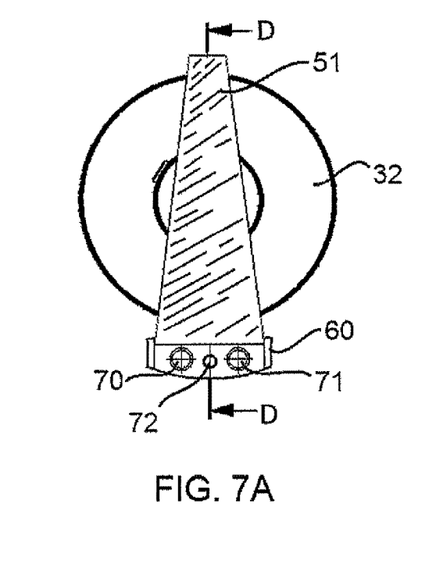
FIG. 7A is a left side view of the prism/tray assembly of FIG. 7C.
Figure 7B:
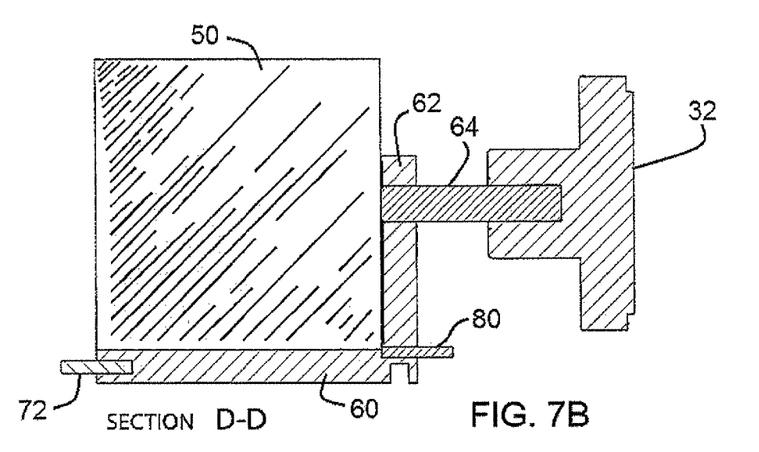
FIG. 7B is a cross-sectional view taken along line D-D of FIG. 7A.
Figure 7C:
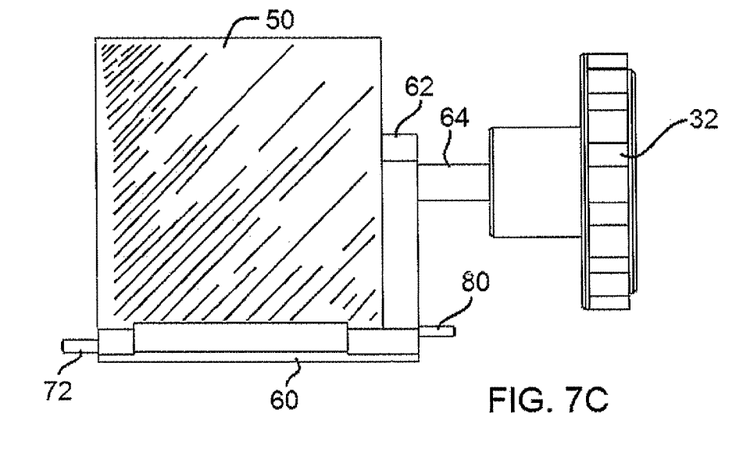
FIG. 7C is a front elevational view of the right prism/tray assembly showing the operating knob.

Referring to FIGS. 7A-7C, the right prism 50 is shown supported by the right prism tray 60 and is rotatable about the right tray pivot pin 64 by rotating the right operating knob 32. The prism tray 60 is mounted for rotation about the right tray pivot pin 64 by the right tray support arm 62; thus, rotation of the right operating knob 32 results in the rotation of the prism 50 about an axis passing through the prism. This axis of prism rotation is generally perpendicular to the line of sight of the observer.

The right prism tray 60 is provided with an inter-tray pivoting limiting pin 72 as described in connection with FIG. 5 and is also provided with a prism rotation limiting pin 80 to limit the total available rotation for both prisms when they are being simultaneously rotated through actuation of an operating knob.

Figure 10:
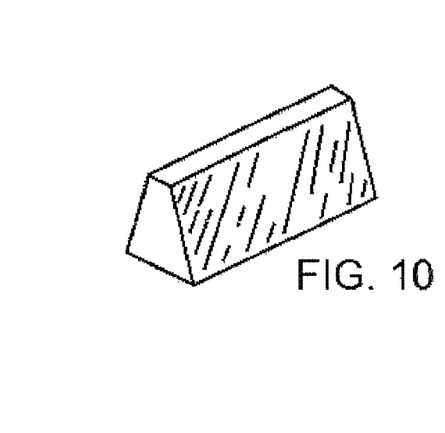
FIG. 10 is a perspective view of a prism for use in the device of the present invention.

Each triangular prism, such as shown in FIG. 10, is preferably formed of optical quality clear glass and conveniently constructed having a base width of 0.75 inch and a length of 2 inches. In a preferred embodiment, the prism is 1 inch in height and is provided with a 0.25 inch top surface parallel to the plane of the base. Each prism is secured to the corresponding tray by a convenient means such as a cement compound. The triangular prisms may be truncated as shown to conserve space within the housing. Those skilled in the art will recognize the shave of the triangular prisms.

Figure 9:
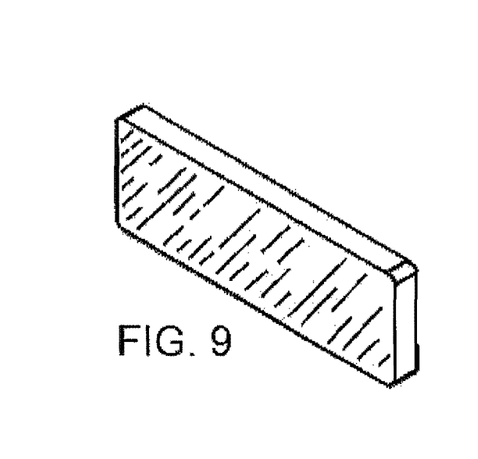
FIG. 9 is a perspective view of an optical filter for use in the device of the present invention.

Optical filters are provided in three selected colors, red, blue and yellow. The optical filters, such as that shown in FIG. 9, are sized to be supported and secured by the filter supporting flange 38 of the device housing 10 and may typically be 4.75 inches in length and 2.65 inches in height while maintaining a constant thickness of 0.375 inches. The optical filter may be made from optical glass, gels, films or suitable rigid plastic materials having appropriate optical characteristics. The specific colors chosen for the filters may vary and are not restricted to a specific wavelength for each of the designated colors red, blue and yellow; however, the suggested colors are blue lapis for the blue optical filter, yellow lapis for the yellow optical filter, and blood ruby for the red optical filter. The optical filters are thus selected to transmit light in wavelength ranges within the red, blue and yellow portions of the visible light spectrum.

In use, it may be convenient to mount the housing on a supporting device such as a camera tripod. Supporting the housing in this manner will facilitate the utilization of the optical characteristics by steadying the housing during use. To facilitate the mounting of the housing in this manner, an attachment member 58 is provided. Referring to FIGS. 8A and 8B, the attachment member is secured to the device housing through screw fittings 57 that provide threaded connection of the fitting to the housing 10. The fitting is provided by an internally threaded bore 59 to receive a standard bolt or screw to thereby facilitate attachment of the device to the supporting device or tripod.

The method of the present invention includes the use of Applicant's described device and positioning of the device direct and straight optical passageway to permit the user's (observer's) line of sight to pass through the passageway and through a prism to a subject for viewing. A selected color optical filter is placed in the observer's line of sight to permit the viewer to view the subject through the prism and the selected color optical filter and rotating the prism. A second optical filter of a different color is then chosen to replace the first optical filter and the viewer again views the subject through the device passageway along the viewer's line of sight to observe the subject while rotating the prism. A third optical filter replaces the second filter in the line of sight of the viewer to permit the viewer to observe the subject through the third optical filter while rotating the prism. The third optical filter is removed and the subject is observed through the clear prism that may permit an observer to visualize any unusual colors on, near or adjacent the subject.

The clear prisms may be simultaneously rotated by operation of the operating knobs to thereby modify the view observed by the observer as the optical path of the light from the subject passes through the prisms as they are rotated to an angular position where any unusual colors come into view. At this point the prism rotation stops and the subject, object or scene is viewed by the observer. To accommodate variations in the individual eyes of the observer, limited inter-prism rotation may be achieved by holding one operating knob and slightly rotating the other to cause the respective prisms to alter their relative angular positions. The prisms, when adjusted, are thus held in this adjusted position by the magnetic force provided in the prism trays to which the respective prisms are secured.

The present invention provides a convenient means for the implementation of subject, object or scene observation without the substantial cost of creating optical prisms constructed of materials such as optical glass and tinted to pass electromagnetic wavelengths in the visual spectrum and which duplicate the colors of lapis lazuli for blue, blood ruby for red, and yellow lapis. The reference to naturally occurring materials such as lapis do not present a precise wavelength but are a reference to wavelength ranges in the blue, red and yellow spectrums; more precise wavelengths or wavelength ranges may be empirically determined. The construction of the required prisms utilizing these materials can be very expensive; the substitution of clear optical prisms combined with filters formed of glass, gels or plastic is a substantial cost savings. Filters made from the same color materials are much more easily produced and are thus considerably less expensive. The ability to accommodate slight angular adjustments between the respective clear prisms to accommodate differences in the observer's eyes combined with the ability to rotate both prisms simultaneously while maintaining the slight angular variation is also a significant improvement to facilitate convenient observation without complex mechanisms.

The present invention has been described in terms of selected specific embodiments of the apparatus and method incorporating details to facilitate the understanding of the principles of construction and operation of the invention. Such reference herein to a specific embodiment and details thereof is not intended to limit the scope of the claims appended hereto. It will be apparent to those skilled in the art that modifications may be made in the embodiments chosen for illustration without departing from the spirit and scope of the invention.

What is claimed:

1. An optical viewing device comprising:
   (a) a housing having a direct and straight optical passageway therethrough to provide a straight and direct line of sight from an observer to an observed subject through said housing;
   (b) a clear optical triangular prism mounted within said housing and said passageway and positioned in the observer's line of sight to permit the observer to view the subject through the clear optical prism;
   (c) said housing including means for supporting an optical filter, selected from a plurality of optical filters, in the observer's line of sight to permit the observer to view said subject through said direct and straight optical passageway, prism and through said optical filter;
   (d) said optical filter, selected from a plurality of optical filters, successively chosen to transmit a different selected range of wavelengths in the red, blue and yellow portions of the visible light spectrum.

2. A device according to claim 1 wherein said means for supporting an optical filter is a flange formed on said housing.

3. A method for viewing a subject, object or scene through a device having a direct and straight optical passageway comprising:
   (a) providing a housing having a direct and straight optical passageway therethrough to permit an observer to view a subject along the observer's line of sight passing through the passageway;
   (b) said housing including means for supporting an optical filter, selected from a plurality of optical filters, in the observer's line of sight through the passageway to permit the observer to view said subject through said direct and straight optical passageway, and through a selected optical filter;
   (c) said optical filter selected from a plurality of optical filters each chosen to transmit a different selected range of wavelengths in the red, blue and yellow color portions of the visible light spectrum and preferably corresponding to the natural wavelengths of lapis, blood ruby, or yellow lapis;
   (d) positioning an optical filter having a chosen range of wavelength of one color in said passageway and in a line of sight of an observer's eyes and viewing a subject through said passageway and through the filter;
   (e) selecting a second optical filter having a second range of wavelength of a second color to replace said first filter and viewing the subject through said passageway and through the second filter; and
   (f) selecting a third optical filter having a third range of wavelength of a third color to replace said second filter and viewing the subject through said passageway and through the third filter.

4. An optical viewing device comprising:
   (a) a housing having a direct and straight optical passageway therethrough to permit a straight and direct line of sight from an observer to an observed subject through said housing;
   (b) a clear optical triangular prism mounted within said housing and said passageway and positioned in the observer's line of sight to permit the observer to view the subject through the clear optical prism;
   (c) said prism comprising a left prism and a right prism corresponding to an observer's left and right eyes, respectively, each independently mounted for rotation about a common axis substantially perpendicular to said line of sight;
   (d) said housing including means for supporting an optical filter, selected from a plurality of optical filters, in the observer's line of sight to permit the observer to view said subject through said direct and straight optical passageway, prism and through said optical filter;
   (e) said optical filter is selected from a plurality of optical filters each chosen to transmit a different selected range of wavelengths in the red, blue and yellow portions of the visible light spectrum.

5. The optical viewing device of claim 4 wherein the selected range of wavelengths correspond to the natural wavelengths of lapis lazuli, blood ruby or yellow lapis.

* * * * *